(12) United States Patent
Zheng et al.

(10) Patent No.: US 9,904,862 B2
(45) Date of Patent: Feb. 27, 2018

(54) THREE-DIMENSIONAL PRINTING MODELING APPARATUS FOR HAND-WRITTEN CHARACTERS AND METHOD THEREOF

(71) Applicants: Inventec Appliances (Pudong) Corporation, Shanghai (CN); Inventec Appliances Corp., New Taipei (TW); Inventec Appliances (Shanghai) Co., Ltd., Shanghai (CN)

(72) Inventors: Yong-Ping Zheng, Shanghai (CN); Shih-Kuang Tsai, Shanghai (CN)

(73) Assignees: Inventec Appliances (Pudong) Corporation, Shanghai (CN); Inventec Appliances Corp., New Taipei (TW); Inventec Appliances (Shanghai) Co., Ltd., Shanghai (CN)

( * ) Notice: Subject to any disclaimer, the term of this patent is extended or adjusted under 35 U.S.C. 154(b) by 271 days.

(21) Appl. No.: 14/794,827

(22) Filed: Jul. 9, 2015

(65) Prior Publication Data

US 2016/0188988 A1 Jun. 30, 2016

(30) Foreign Application Priority Data

Feb. 24, 2014 (CN) .......................... 2014 1 0837767

(51) Int. Cl.
| | |
|---|---|
| *G06K 9/18* | (2006.01) |
| *G06K 9/00* | (2006.01) |
| *G06T 17/00* | (2006.01) |
| *G06K 9/22* | (2006.01) |

(52) U.S. Cl.
CPC ..... *G06K 9/00865* (2013.01); *G06K 9/00416* (2013.01); *G06K 9/224* (2013.01); *G06T 17/00* (2013.01); *G06T 2200/08* (2013.01)

(58) Field of Classification Search
None
See application file for complete search history.

(56) References Cited

U.S. PATENT DOCUMENTS

| | | | | |
|---|---|---|---|---|
| 2010/0166312 | A1* | 7/2010 | Jang | .......................... G06K 9/46 382/187 |
| 2014/0055445 | A1* | 2/2014 | Cook | ...................... G06T 17/00 345/419 |
| 2015/0269432 | A1* | 9/2015 | Motoi | .................... G06K 9/222 382/189 |

* cited by examiner

*Primary Examiner* — Manav Seth
*Assistant Examiner* — David Perlman
(74) *Attorney, Agent, or Firm* — CKC & Partners Co., Ltd.

(57) ABSTRACT

A three-dimensional printing modeling apparatus for hand-written characters and a method thereof are disclosed. Based on the fact that hand-written characters can be finished in one stroke, the present disclosure includes identifying linking feature information of strokes inside or between the hand-written characters, forming a curve linked between the strokes inside or between the hand-written characters according to the linking feature information, and performing three-dimensional modeling of the hand-written characters to obtain a three-dimensional printing object.

19 Claims, 7 Drawing Sheets

THREE-DIMENSIONAL PRINTING MODELING APPARATUS FOR HAND-WRITTEN CHARACTERS AND METHOD THEREOF

CROSS-REFERENCE TO RELATED APPLICATION

This application claims the priority benefit of Chinese Application serial no. 201410837767.X, filed Dec. 24, 2014, the full disclosure of which is incorporated herein by reference.

BACKGROUND

Field of Invention

The present disclosure relates to the field of three-dimensional printing technology. More particularly, the present disclosure relates to a three-dimensional printing modeling apparatus for hand-written characters and a method thereof.

Description of Related Art

Three-dimensional printing is one type of additive manufacturing technology, and a three-dimensional printer constructs continuous physical layers to make three-dimensional printing objects. As compared to other additive manufacturing technologies, the three-dimensional printer is much cheaper, faster and easier to use. The three-dimensional printer is an apparatus for printing real three-dimensional objects, and just like laser direct structuring technology, the three-dimensional printer utilizes layer processing and superimposed structuring (i.e., adding materials layer-by-layer) to make three-dimensional objects. Therefore, three-dimensional printing technology is totally different from traditional processing technologies which involve removing materials. The three-dimensional printer is so named because the principle of layer processing is extremely similar to the operation performed by an inkjet printer.

With the development of the three-dimensional printer, the three-dimensional printer and its services are increasingly appearing in the daily life of consumers. In the consumer market, the focus of three-dimensional printing technology is changed from the development of the three-dimensional printer to personalized three-dimensional printing services such as designing and creating. Whether the three-dimensional printer can accurately print objects is greatly dependent upon the setting of the three-dimensional printer. Therefore, ways in which to allow consumers to create personalized three-dimensional models and then perform printing by themselves has become an important direction of development for the future.

In general, hand-written characters are the most personalized creative elements of consumers. Combined with the handwriting function of mobile devices, performing three-dimensional modeling of hand-written characters to obtain a three-dimensional printing object can stimulate the interest of consumers. However, there is still no efficient way to achieve three-dimensional modeling of hand-written characters to obtain a three-dimensional printing object.

SUMMARY

The following presents a simplified summary of the disclosure in order to provide a basic understanding to the reader. This summary is not an extensive overview of the disclosure and it does not identify key/critical components of the present disclosure or delineate the scope of the present disclosure. Its sole purpose is to present some concepts disclosed herein in a simplified form as a prelude to the more detailed description that is presented later.

One aspect of the present disclosure is to provide a three-dimensional printing modeling apparatus for hand-written characters. The three-dimensional printing modeling apparatus for hand-written characters includes a data capturing unit, a stroke linking feature extraction unit, a stroke linking feature database, an integration analyzing processing unit and a three-dimensional modeling unit. The data capturing unit is configured for collecting a plurality of hand-written characters according to motion traces of the hand-written characters. The stroke linking feature extraction unit is configured for identifying linking feature information of strokes inside or between the hand-written characters. The stroke linking feature database is configured for storing the linking feature information of the strokes inside or between the hand-written characters. The integration analyzing processing unit is configured for accessing the linking feature information of the strokes inside or between the hand-written characters in the stroke linking feature database, and forming a curve linked between the strokes inside or between the hand-written characters according to the linking feature information. The three-dimensional modeling unit is configured for performing three-dimensional modeling of the hand-written characters.

Another aspect of the present disclosure is to provide a three-dimensional printing modeling method for hand-written characters. The three-dimensional printing modeling method for hand-written characters includes collecting a plurality of hand-written characters according to motion traces of the hand-written characters, identifying and storing linking feature information of strokes inside or between the hand-written characters, and forming a curve linked between the strokes inside or between the hand-written characters according to the linking feature information in response to performing three-dimensional modeling of the hand-written characters.

Still another aspect of the present disclosure is to provide a non-transitory machine-readable storage medium comprising a computer program, which, when executed, causes a device to perform a memory management method. The method includes collecting a plurality of hand-written characters according to motion traces of the hand-written characters, identifying and storing linking feature information of strokes inside or between the hand-written characters, and forming a curve linked between the strokes inside or between the hand-written characters according to the linking feature information in response to performing three-dimensional modeling of the hand-written characters.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In this document, the term "coupled" may also be termed as "electrically coupled," and the term "connected" may be termed as "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The difficulty of three-dimensional printing hand-written characters is that hand-written characters are usually finished in one stroke. Therefore, if linking feature information of the strokes inside or between the hand-written characters can not be processed, the hand-written characters can not be accurately identified. Next, the linking of strokes inside or between the hand-written characters can not be processed during the subsequent three-dimensional modeling of the hand-written characters. To overcome these problems, based on the fact that hand-written characters can be finished in one stroke, the present disclosure discloses the following steps: identifying linking feature information of strokes inside or between hand-written characters; forming a curve linked between the strokes inside or between the hand-written characters according to the linking feature information; and performing three-dimensional modeling of the hand-written characters to obtain a three-dimensional printing object.

Figure 1:
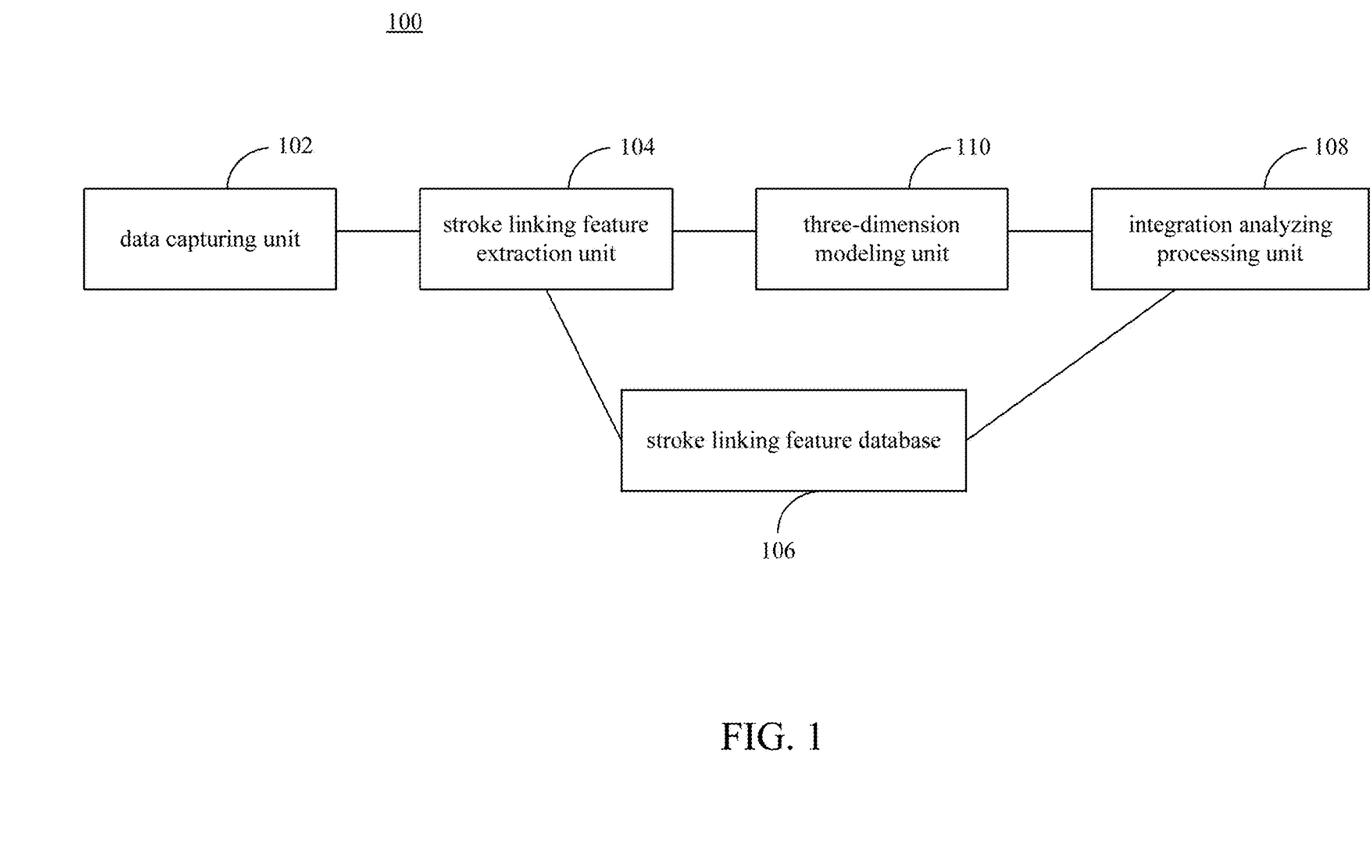
FIG. 1 is a schematic block diagram of a three-dimensional printing modeling apparatus for hand-written characters according to an embodiment of the present disclosure.

FIG. 1 is a schematic diagram of a three-dimensional printing modeling apparatus 100 for hand-written characters according to an embodiment of the present disclosure. The three-dimensional printing modeling apparatus 100 for hand-written characters includes a data capturing unit 102, a stroke linking feature extraction unit 104, a stroke linking feature database 106, an integration analyzing processing unit 108 and a three-dimensional modeling unit 110. The data capturing unit 102 is configured for collecting a plurality of hand-written characters according to motion traces of the hand-written characters. The stroke linking feature extraction unit 104 is configured for identifying linking feature information of strokes inside or between the hand-written characters. The stroke linking feature database 106 is configured for storing the linking feature information of the strokes inside or between the hand-written characters. The integration analyzing processing unit 108 is configured for accessing the linking feature information of the strokes inside or between the hand-written characters in the stroke linking feature database 106, and forming a curve linked between the strokes inside or between the hand-written characters according to the linking feature information. The three-dimensional modeling unit 110 is configured for performing three-dimensional modeling of the hand-written characters.

In the three-dimensional printing modeling apparatus 100 for hand-written characters, the data capturing unit 102 is further configured for performing two-dimensional displaying of the collected hand-written characters.

In the three-dimensional printing modeling apparatus 100 for hand-written characters, the integration analyzing processing unit 108 is further configured for forming the curve linked between the strokes inside or between the hand-written characters according to the linking feature information before or after the three-dimensional modeling unit 110 models the hand-written characters.

In the three-dimensional printing modeling apparatus 100 for hand-written characters, the linking feature information of the strokes inside or between the hand-written characters includes names of the strokes in order, coordinate information of terminal points of the curve and a linking curve feature of the curve.

In the three-dimensional printing modeling apparatus 100 for hand-written characters, the stroke linking feature extraction unit 104 is further configured for segmenting the hand-written characters, analyzing a stroke order structure of each hand-written character, identifying the coordinate information of terminal points of the stroke order structure of each hand-written character, obtaining the linking curve feature between the terminal points of the stroke order structure, and generating the linking feature information of the strokes inside or between the hand-written characters according to the names of the strokes in order, the coordinate information of terminal points and the linking curve feature.

In the three-dimensional printing modeling apparatus 100 for hand-written characters, the integration analyzing processing unit 108 is further configured for accessing the linking feature information of the strokes inside or between the hand-written characters and confirming a stroke order structure of each hand-written character according to the linking feature information of the hand-written characters; confirming the coordinate information of terminal points of the stroke order structure of each hand-written character; confirming the linking curve feature between the terminal points of the stroke order structure; and forming the curve linked between the strokes inside or between the hand-written characters according to the confirmed linking curve feature.

Particularly, the data capturing unit 102 is configured for collecting and displaying a plurality of hand-written characters according to motion traces of the hand-written characters. Each stroke of the hand-written characters is stored according to the coordinates and the order passed by the motion traces. At the same time the hand-written characters are depicted and displayed according to the coordinates and the order passed by the motion traces. While the hand-written characters are being collected, the collecting parameters include a stroke amount, stroke order information and coordinate information of each stroke. The coordinate information of each stroke includes start-point coordinates and end-point coordinates of each stroke.

Figure 2:
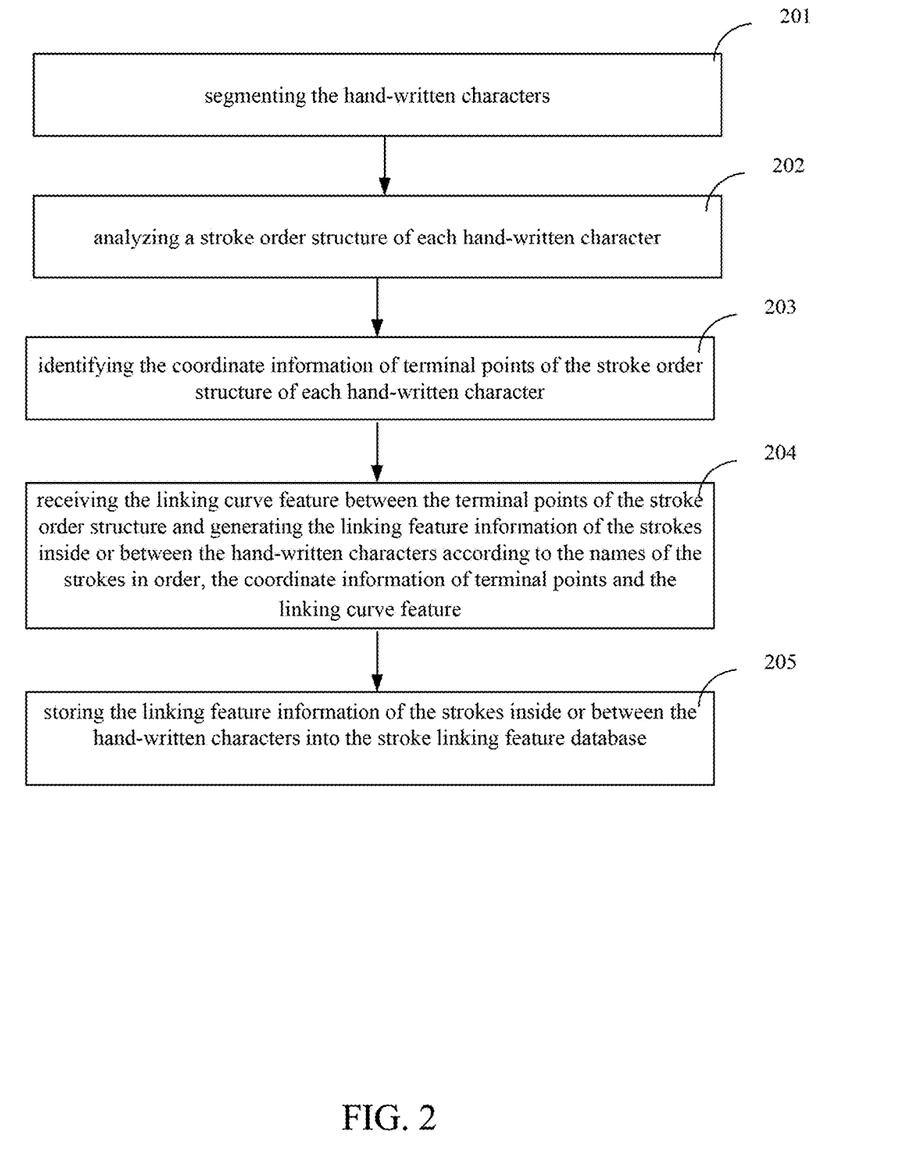
FIG. 2 is a flow chart related to a stroke linking feature extraction unit identifying linking feature information of strokes inside hand-written characters according to an embodiment of the present disclosure.

In order to identify linking feature information of strokes inside the hand-written characters, the stroke linking feature extraction unit 104 utilizes the process shown in FIG. 2. FIG. 2 is a flow chart related to the stroke linking feature extraction unit identifying linking feature information of strokes inside the hand-written characters according to an embodiment of the present disclosure. An example of strokes inside the hand-written characters is used for explanation herein and details in this regard are provided below.

In step 201, the hand-written characters are segmented.

In step 202, a stroke order structure of each hand-written character is analyzed.

In step 203, the coordinate information of terminal points of the stroke order structure of each hand-written character is identified.

In step 204, the linking curve feature between the terminal points of the stroke order structure is obtained, and the linking feature information of the strokes inside or between the hand-written characters is generated according to the names of the strokes in order, the coordinate information of terminal points and the linking curve feature.

In step 205, the linking feature information of the strokes inside or between the hand-written characters is stored into the stroke linking feature database 106.

In this embodiment, in order to confirm the writing habits of the writers, the hand-written characters are respectively identified after the hand-written characters are segmented. According to the steps shown in FIG. 2, the linking feature information of the strokes inside the hand-written characters is generated and stored, and thus the curve linked between the strokes of the hand-written characters can be formed according to the linking curve feature during the following three-dimensional modeling of the hand-written characters. Each segmented hand-written character can help confirm the stroke order structure of each hand-written character. For example, Chinese characters have many kinds of structures such as independent structures, up-down-structures and left-right structures. Each stroke of the hand-written characters is confirmed to generate the linking feature information of the strokes inside the hand-written characters, and then the linking feature information is stored in the stroke linking feature database 106. Table 1 is the most common stroke order structure of the hand-written characters, and is shown as below:

TABLE 1

| Type of stroke order structure | Example |
|---|---|
| Single structure | 米、日 |
| "品"-type structure | 品、森 |
| Up-down structure | 思、华 |
| Up-middle-down structure | 芯 |
| Left-right structure | 村、联 |
| Left-middle-right structure | 街、游 |
| Enclosed structure | 国、固 |
| Semi-enclosed structure | 区、区 |

Figure 3:
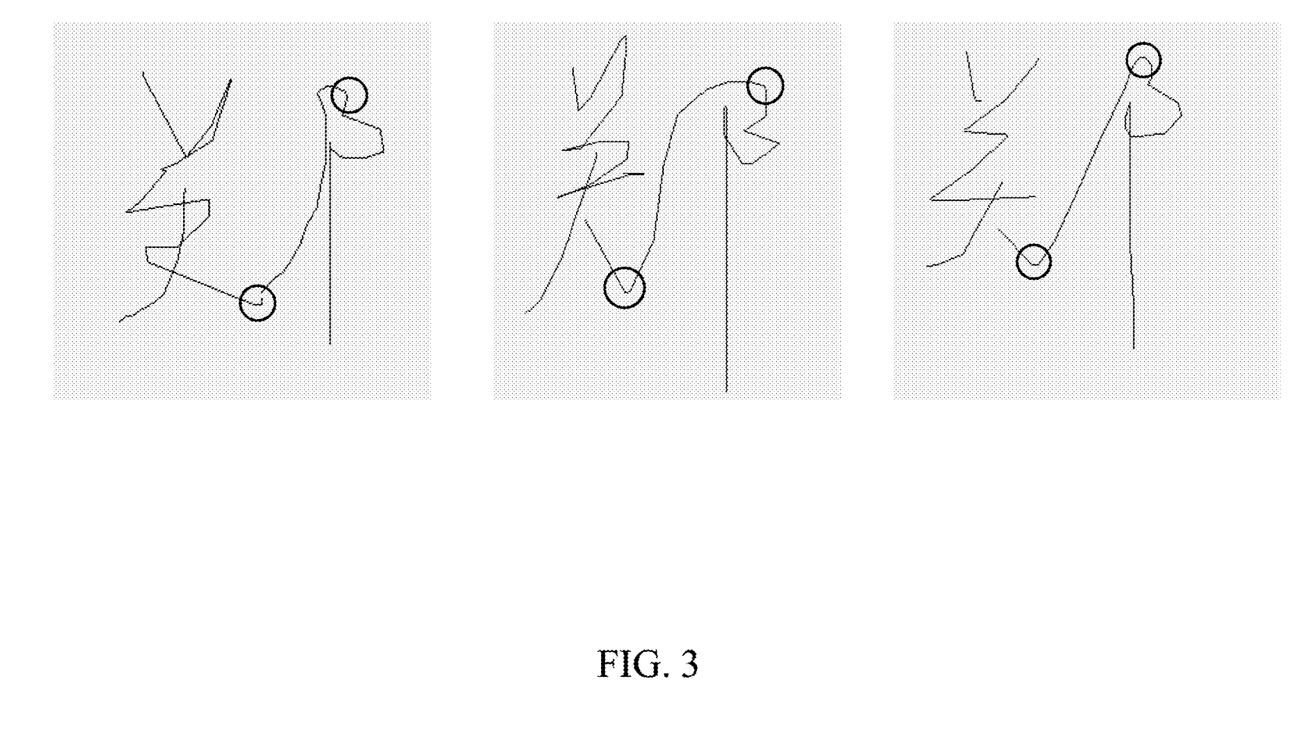
FIG. 3 is a schematic diagram of identifying linking feature information of the hand-written character "鄒" according to an embodiment of the present disclosure.

The following description takes the left-right structure for example to explain the generation of the linking feature information from each part of the stroke order structure of the hand-written characters. For example, the hand-written character "郑" is a left-right structure. The last stroke of the left side of the structure is a dot stroke, and the first stroke of the right side of the structure is a horizontal stroke. After the hand-written character "郑" is segmented, the stroke order structure of the hand-written character is further analyzed to accurately obtain the coordinate information such as the end-point coordinates of the left side of the structure and the start-point coordinates of the right side of the structure. FIG. 3 is a schematic diagram of identifying linking feature information of the hand-written character "郑" according to an embodiment of the present disclosure. As shown in FIG. 3, circled points are positioned and recorded into coordinates, and then the linking curve feature between the start-point and the end-point (circled points) is identified and obtained to update the stored linking feature information. There are three kinds of writing habits of the same left-right structure shown in FIG. 3. That is to say, three different kinds of the curve linked between two circled points in each structure are analyzed to obtain the linking curve feature. Therefore, the obtained linking curve feature can be applied to other hand-written characters with the same structure. There are three typical types of writing habits shown in FIG. 3. The first type is a concave curve, the second type is a convex curve, and the third type is a nearly straight curve. The linking curve feature between the lower left start-point and the upper right end-point (circled points) can be identified and stored. The linking curve feature can further be used for confirming each curve linked between the hand-written characters after the hand-written characters are modeled in three dimensions.

Figure 4:
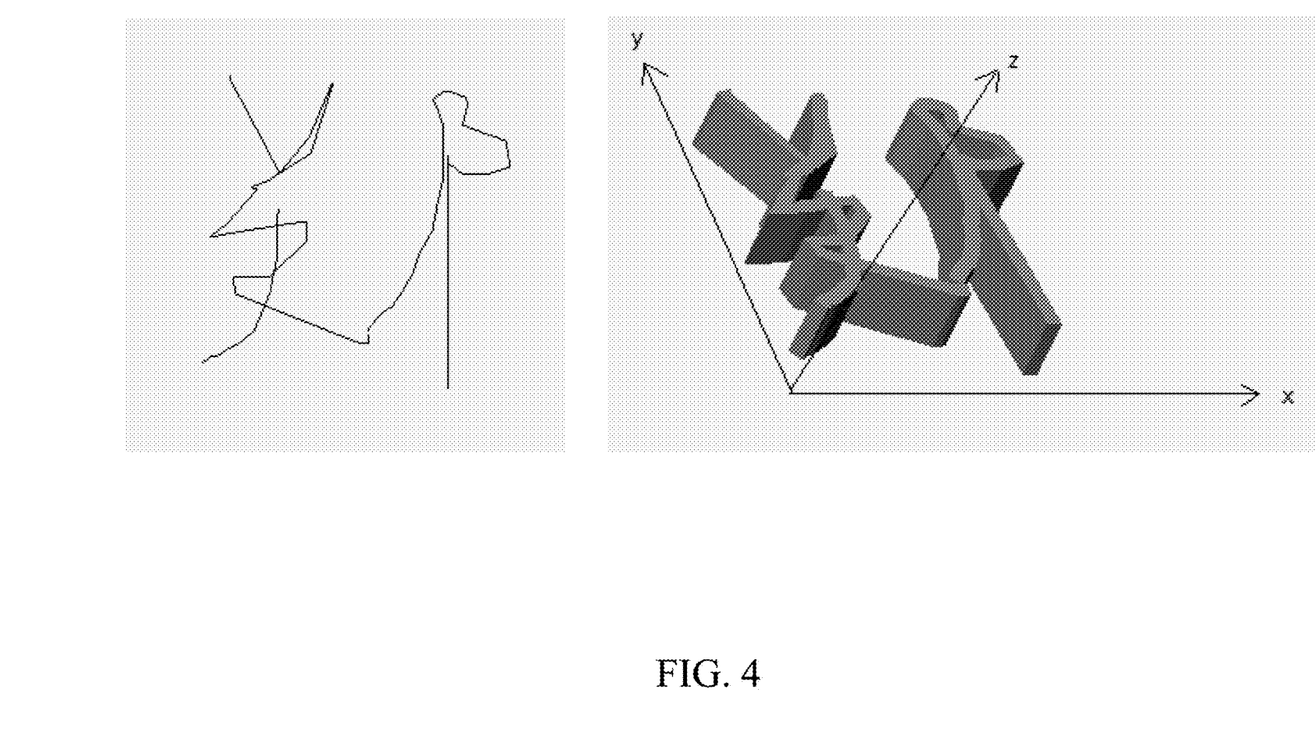
FIG. 4 is a schematic diagram for a three-dimensional modeling unit to model hand-written characters according to an embodiment of the present disclosure.

The three-dimensional modeling unit 110 is configured for transforming the hand-written characters from two dimensions to three dimensions. The contours of the two-dimensional hand-written characters are regarded as an enclosed space to construct the three-dimensional hand-written characters in the spatial coordinate system. It should be noted that the three-dimensional hand-written characters have an equal depth in the z direction. FIG. 4 is a schematic diagram for the three-dimensional modeling unit 110 to model hand-written characters according to an embodiment of the present disclosure. As shown in FIG. 4, the enclosed contours are constructed in the z direction to obtain the three-dimensional hand-written characters.

The integration analyzing processing unit 108 is configured for analyzing the linking feature information of the strokes inside or between the hand-written characters stored in the stroke linking feature database 106. The integration analyzing processing unit 108 is configured for naturally linking the strokes of the three-dimensional hand-written characters. In greater detail, the contents of the linking feature information such as the stroke amount, the stroke order information and the coordinate information of each stroke (including start-point coordinates and end-point coordinates) are used as input parameters to analyze the coordinates of the end-point of the last stroke and the start-point of the next stroke for confirming the strokes linked naturally. Therefore, the stroke linking feature database 106 is then utilized to obtain the coordinates of the end-point of the last stroke and the start-point of the next stroke. In the stroke linking feature database 106, there is the linking feature information of the hand-written characters including the information about how the arbitrary two points are naturally linked according to the position of the two points and the distance between the two points. In order to make the features of the linked curves in accordance with the writing habits of the writers, the linking feature information is stored in the stroke linking feature database 106 after being generated by the stroke linking feature extraction unit 104. The linking curve feature between the adjacent strokes is generated according to the relative positions of the start-point and the end-point, and the writing tendency between the last stroke and the next stroke. Therefore, the linking feature information includes names of the strokes in order, coordinate information of terminal points of the curve and a linking curve feature of the curve.

Figure 5:
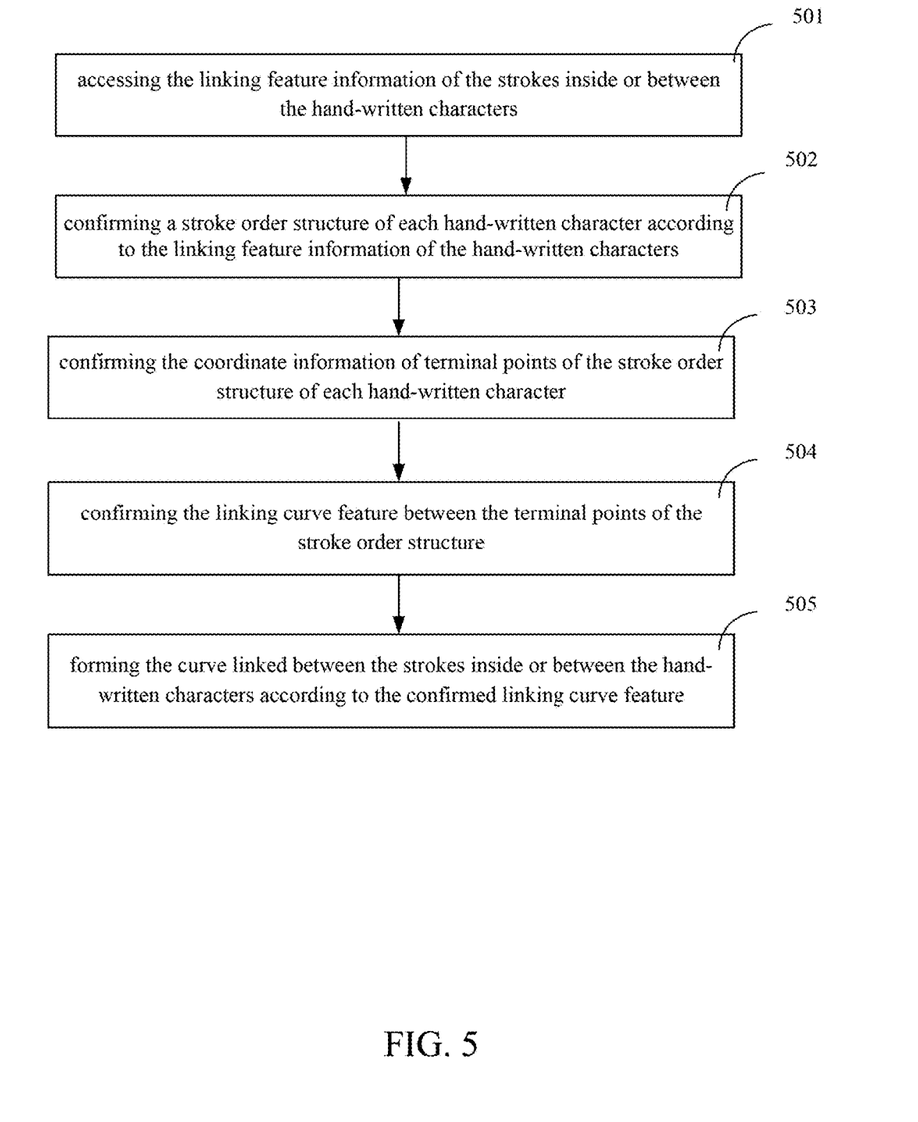
FIG. 5 is a flow chart for an integration analyzing processing unit to form a curve linked between the strokes inside or between hand-written characters according to an embodiment of the present disclosure.

Naturally linking the strokes of the three-dimensional hand-written character by the integration analyzing processing unit 108 is shown in FIG. 5, and includes a number of steps as outlined below.

In step 501, the linking feature information of the hand-written characters is accessed.

In step 502, a stroke order structure of each hand-written character is confirmed according to the linking feature information of the hand-written characters.

In step 503, the coordinate information of terminal points of the stroke order structure of each hand-written character is confirmed.

In step 504, the linking curve feature between the terminal points of the stroke order structure is confirmed.

In step 505, the curve linked between the strokes inside or between the hand-written characters is formed according to the confirmed linking curve feature.

Figure 6:
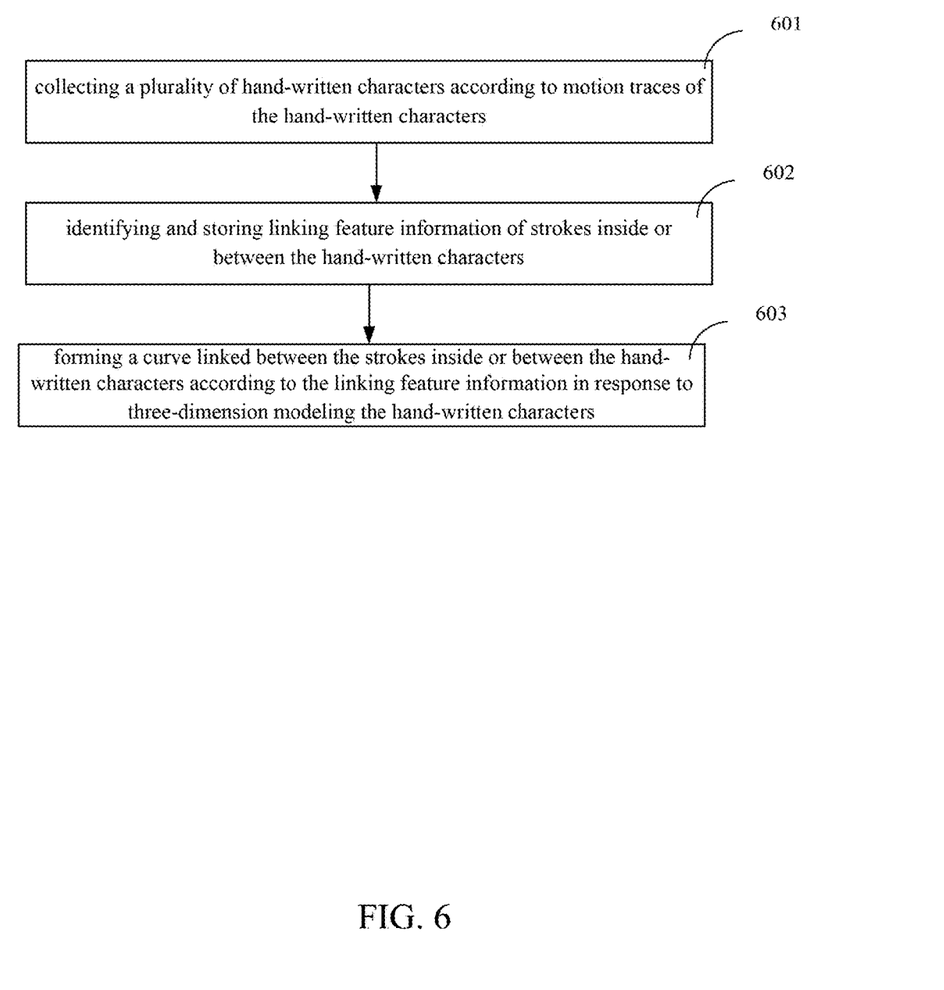
FIG. 6 is a flow chart of a three-dimensional printing modeling method for hand-written characters according to an embodiment of the present disclosure.

FIG. 6 is a flow chart of a three-dimensional printing modeling method for hand-written characters according to an embodiment of the present disclosure. The method includes a number of steps as outlined below.

In step 601, a plurality of hand-written characters are collected according to motion traces of the hand-written characters.

In step 602, linking feature information of strokes inside or between the hand-written characters is identified and stored.

In step 603, a curve linked between the strokes inside or between the hand-written characters is linked according to the linking feature information in response to performing three-dimensional modeling of the hand-written characters.

In this embodiment, the hand-written characters are displayed in two dimensions after being collected.

In this embodiment, the curve, linked between the strokes inside or between the hand-written characters according to the stored linking feature information, is formed before or after the three-dimensional modeling unit models the hand-written characters.

In this embodiment, the linking feature information of the strokes inside or between the hand-written characters includes names of the strokes in order, coordinate information of terminal points of the curve and a linking curve feature of the curve.

In this embodiment, the step of identifying the linking feature information of the strokes inside or between the hand-written characters includes segmenting the hand-written characters, analyzing a stroke order structure of each hand-written character, identifying the coordinate information of terminal points of the stroke order structure of each hand-written character, obtaining the linking curve feature between the terminal points of the stroke order structure, and generating the linking feature information of the strokes inside or between the hand-written characters according to the names of the strokes in order, the coordinate information of terminal points and the linking curve feature.

In this embodiment, the step of forming the curve linked between the strokes inside or between the hand-written characters according to the linking feature information of the hand-written characters includes accessing the linking feature information of the strokes inside or between the hand-written characters and confirming a stroke order structure of each hand-written character according to the linking feature information of the hand-written characters, confirming the coordinate information of terminal points of the stroke order structure of each hand-written character, confirming the linking curve feature between the terminal points of the stroke order structure, and forming the curve linked between the strokes inside or between the hand-written characters according to the confirmed linking curve feature.

Figure 7:
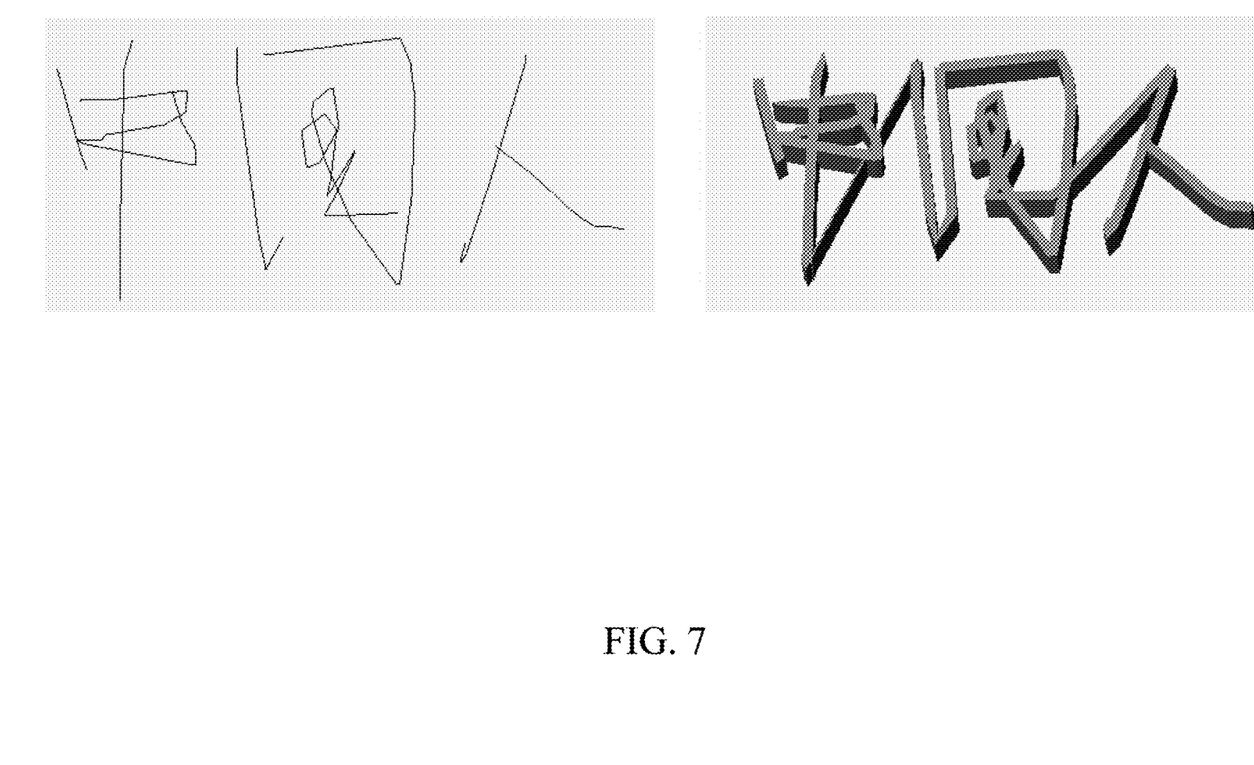
FIG. 7 is a schematic diagram of a final three-dimensional model using a third type of writing habit in FIG. 3, i.e., nearly straight curve linked between strokes according to an embodiment of the present disclosure.

The present disclosure naturally links the strokes of the incompletely linked hand-written characters and generates the three-dimensional model by analyzing the strokes of the hand-written characters and obtaining the linking feature information. The method can ensure that the generated three-dimensional model of the hand-written characters is integrated into one object, and the strokes between hand-written characters are naturally linked. Therefore, the writers can print the real three-dimensional object for their personalized written characters. FIG. 7 is a schematic diagram of the final three-dimensional model using the third type of writing habit in FIG. 3, i.e., nearly straight curve linked between strokes according to an embodiment of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A three-dimensional printing modeling apparatus for hand-written characters, comprising:
    a data capturing unit, configured for collecting a plurality of hand-written characters according to motion traces of the hand-written characters;
    a stroke linking feature extraction unit, configured for identifying linking feature information of strokes inside and between the hand-written characters;
    a stroke linking feature database, configured for storing the linking feature information of the strokes inside and between the hand-written characters;
    an integration analyzing processing unit, configured for accessing the linking feature information of the strokes inside and between the hand-written characters in the stroke linking feature database, and forming a curve linked between the strokes inside and between the hand-written characters according to the linking feature information; and
    a three-dimensional modeling unit, configured for performing three-dimensional modeling of the hand-written characters.

2. The three-dimensional printing modeling apparatus for hand-written characters of claim 1, wherein the data capturing unit is further configured for displaying the collected hand-written characters in two dimensions.

3. The three-dimensional printing modeling apparatus for hand-written characters of claim 1, wherein collecting parameters, utilized by the data capturing unit while collecting the hand-written characters, comprise a stroke amount, stroke order information and coordinate information of each stroke, wherein the coordinate information of each stroke comprises start-point coordinates and end-point coordinates of each stroke.

4. The three-dimensional printing modeling apparatus for hand-written characters of claim 1, wherein the integration analyzing processing unit is further configured for forming the curve linked between the strokes inside and between the hand-written characters according to the linking feature information before or after the three-dimensional modeling unit models the hand-written characters.

5. The three-dimensional printing modeling apparatus for hand-written characters of claim 1, wherein the linking feature information of the strokes inside and between the hand-written characters comprises names of the strokes in order, coordinate information of terminal points of the curve and a linking curve feature of the curve.

6. The three-dimensional printing modeling apparatus for hand-written characters of claim 5, wherein the stroke linking feature extraction unit is further configured for segmenting the hand-written characters, analyzing a stroke order structure of each hand-written character, identifying the coordinate information of terminal points of the stroke order structure of each hand-written character, obtaining the linking curve feature between the terminal points of the stroke order structure, and generating the linking feature information of the strokes inside and between the hand-written characters according to the names of the strokes in order, the coordinate information of terminal points and the linking curve feature.

7. The three-dimensional printing modeling apparatus for hand-written characters of claim 5, wherein the integration analyzing processing unit is further configured for accessing the linking feature information of the strokes inside and between the hand-written characters and confirming a stroke order structure of each hand-written character according to the linking feature information of the hand-written characters; confirming the coordinate information of terminal points of the stroke order structure of each hand-written character; confirming the linking curve feature between the terminal points of the stroke order structure; and forming the curve linked between the strokes inside and between the hand-written characters according to the confirmed linking curve feature.

8. A three-dimensional printing modeling method for hand-written characters, comprising:
  collecting a plurality of hand-written characters according to motion traces of the hand-written characters;
  identifying and storing linking feature information of strokes inside and between the hand-written characters; and
  forming a curve linked between the strokes inside and between the hand-written characters according to the linking feature information in response to performing three-dimensional modeling of the hand-written characters.

9. The three-dimensional printing modeling method for hand-written characters of claim 8, wherein the collected hand-written characters are displayed in two dimensions.

10. The three-dimensional printing modeling method for hand-written characters of claim 8, wherein collecting parameters utilized while collecting the hand-written characters comprise a stroke amount, stroke order information and coordinate information of each stroke, wherein the coordinate information of each stroke comprises start-point coordinates and end-point coordinates of each stroke.

11. The three-dimensional printing modeling method for hand-written characters of claim 8, wherein the curve, linked between the strokes inside and between the hand-written characters according to the stored linking feature information, is formed before or after the three-dimensional modeling unit models the hand-written characters.

12. The three-dimensional printing modeling method for hand-written characters of claim 8, wherein the linking feature information of the strokes inside and between the hand-written characters comprises names of the strokes in order, coordinate information of terminal points of the curve and a linking curve feature of the curve.

13. The three-dimensional printing modeling method for hand-written characters of claim 8, wherein the step of identifying the linking feature information of the strokes inside and between the hand-written characters comprises:
  segmenting the hand-written characters;
  analyzing a stroke order structure of each hand-written character;
  identifying the coordinate information of terminal points of the stroke order structure of each hand-written character;
  obtaining the linking curve feature between the terminal points of the stroke order structure; and
  generating the linking feature information of the strokes inside and between the hand-written characters according to the names of the strokes in order, the coordinate information of terminal points and the linking curve feature; and
  wherein the step of forming the curve linked between the strokes inside and between the hand-written characters according to the linking feature information of the hand-written characters comprises:
  accessing the linking feature information of the strokes inside and between the hand-written characters and confirming a stroke order structure of each hand-written character according to the linking feature information of the hand-written characters;
  confirming the coordinate information of terminal points of the stroke order structure of each hand-written character;
  confirming the linking curve feature between the terminal points of the stroke order structure; and
  forming the curve linked between the strokes inside and between the hand-written characters according to the confirmed linking curve feature.

14. A non-transitory machine-readable storage medium comprising a computer program, which, when executed, causes a device to perform a memory management method, wherein the method comprises:
  collecting a plurality of hand-written characters according to motion traces of the hand-written characters;
  identifying and storing linking feature information of strokes inside and between the hand-written characters; and
  forming a curve linked between the strokes inside and between the hand-written characters according to the linking feature information in response to performing three-dimensional modeling of the hand-written characters.

15. The non-transitory machine-readable storage medium of claim 14, wherein the collected hand-written characters are displayed in two dimensions.

16. The non-transitory machine-readable storage medium of claim 14, wherein collecting parameters utilized while collecting the hand-written characters comprise a stroke amount, stroke order information and coordinate information of each stroke, wherein the coordinate information of each stroke comprises start-point coordinates and end-point coordinates of each stroke.

17. The non-transitory machine-readable storage medium of claim 14, wherein the curve, linked between the strokes inside and between the hand-written characters according to the stored linking feature information, is formed before or after the three-dimensional modeling unit models the hand-written characters.

18. The non-transitory machine-readable storage medium of claim 14, wherein the linking feature information of the strokes inside and between the hand-written characters comprises names of the strokes in order, coordinate information of terminal points of the curve and a linking curve feature of the curve.

19. The non-transitory machine-readable storage medium of claim 14, wherein the step of identifying the linking feature information of the strokes inside and between the hand-written characters comprises:
   segmenting the hand-written characters;
   analyzing a stroke order structure of each hand-written character;
   identifying the coordinate information of terminal points of the stroke order structure of each hand-written character;
   obtaining the linking curve feature between the terminal points of the stroke order structure; and
   generating the linking feature information of the strokes inside and between the hand-written characters according to the names of the strokes in order, the coordinate information of terminal points and the linking curve feature;
   wherein the step of forming the curve linked between the strokes inside and between the hand-written characters according to the linking feature information of the hand-written characters comprises:
   accessing the linking feature information of the strokes inside and between the hand-written characters and confirming a stroke order structure of each hand-written character according to the linking feature information of the hand-written characters;
   confirming the coordinate information of terminal points of the stroke order structure of each hand-written character;
   confirming the linking curve feature between the terminal points of the stroke order structure; and
   forming the curve linked between the strokes inside and between the hand-written characters according to the confirmed linking curve feature.

\* \* \* \* \*